F. PAMPE.
DISTILLING COLUMN.
APPLICATION FILED JAN. 3, 1908.

1,048,425. Patented Dec. 24, 1912.

Witnesses.
Jesse N. Sutton

Inventor.
Franz Pampe

UNITED STATES PATENT OFFICE.

FRANZ PAMPE, OF HALLE-ON-THE-SAALE, GERMANY.

DISTILLING-COLUMN.

1,048,425.

Specification of Letters Patent. Patented Dec. 24, 1912.

Application filed January 3, 1908. Serial No. 409,224.

*To all whom it may concern:*

Be it known that I, FRANZ PAMPE, a subject of the German Emperor, residing at Halle-on-the-Saale, Kingdom of Prussia, Germany, have invented certain new and useful Improvements in Distilling-Columns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to distillation and rectification columns.

That the same may work well it is necessary, on the one hand, that the vapor have the necessary velocity for atomizing the liquid, and, on the other hand, that the liquid be not dammed back or unduly retarded in its flow, in consequence of the vapor having too great a velocity.

An important object of the present invention is a substantial improvement in the construction of distilling columns by simplifying the same in such a manner that even when there is a considerable variation in the quantity of vapor flowing through the apparatus it is impossible for the liquid to be dammed back or prevented from flowing through the column, and moreover, that the rectifying action is considerably increased.

In order that the invention may be clearly understood, reference is made to the accompanying drawing, in which one embodiment is represented by way of example.

Figure 1:
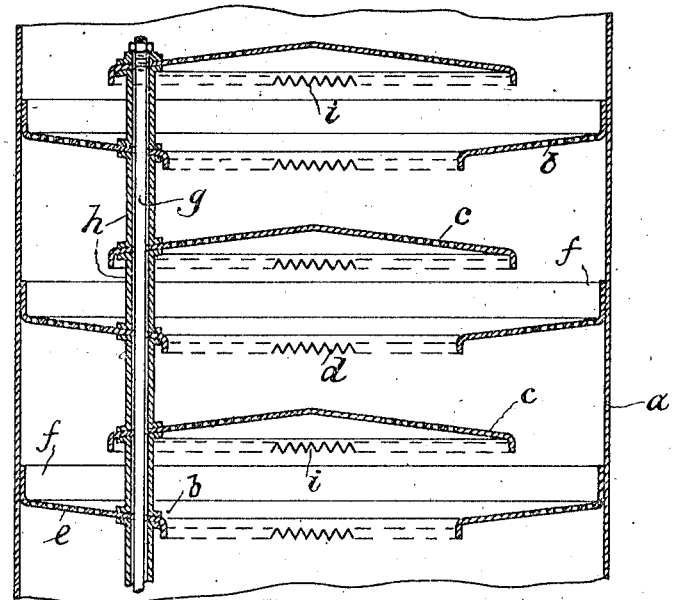
Figure 2:
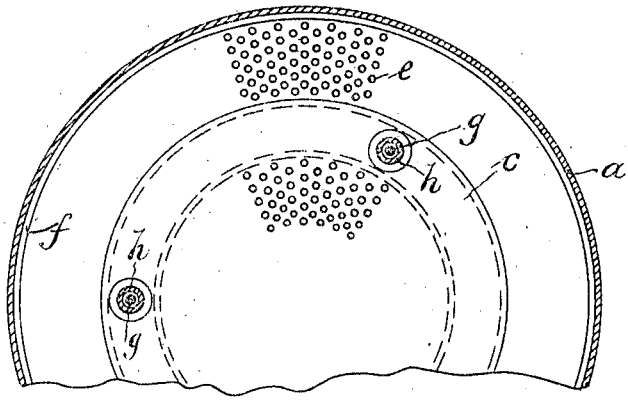

In said drawing—Figure 1 is a vertical section through so much of a column as is necessary for an understanding of the invention. Fig. 2 is a plan of the same.

The column comprises a casing, preferably cylindrical, to the interior of which are connected the annular concave plates *b* by means of their upturned outer flanges *f*, that is, these plates are inclined downwardly from said flanges toward their center. These plates are perforated, as shown at *c* and have an inner, downwardly turned serrated or notched flange *d*. Rods *g* pass through these plates *b* near their inner flange and carry spacing sleeves *h* between which are held the perforated, conical or convex plates *c* also having a downwardly turned serrated flange *i*, that is, these plates *c* are inclined downwardly from their centers toward their edges.

The increased rectifying action hereinabove referred to is obtained by the lower conical plates *c* being provided with perforations *e* in their annular faces (Fig. 2) in such manner that, firstly, a current of vapor from *b* atomizes the liquid which drops down from the points of the notches *d* and the drops of liquid fall onto the plates *c*, and, secondly, that the vapor passes from below the convex or conical plates *c* through the perforations *e* in the same. The liquid flows over and through the plates *c*, and thus two jets of vapor move through the liquid approximately at right angles to one another, and an increased contacting action is obtained between the vapor and the liquid.

What I claim as my invention and desire to secure by Letters Patent is:—

A distilling column comprising in combination, a vertical cylindrical casing, annular, vertically spaced, perforated plates having upwardly directed flanges at their outer periphery secured to the casing, and downwardly directed serrated flanges at their inner periphery, said plates inclined downwardly toward their center, perforated plates, smaller than, spaced from, alternating and concentric with the aforementioned plates, whose surfaces incline downwardly from their centers and have depending serrated flanges at their outer edges, said plates dimensioned to locate their flanges between the inner and outer peripheries of the annular plates and means to maintain the plates in their relative spaced positions.

In witness whereof I have hereunto set my hand in presence of two witnesses.

FRANZ PAMPE.

Witnesses:
HENRY HASPER,
WOLDEMAR HAUPT.